US005103474A

United States Patent [19]

Stoodley et al.

[11] Patent Number: 5,103,474

[45] Date of Patent: Apr. 7, 1992

[54] DRIVE-BY PERSONNEL MONITORING SYSTEM WITH RADIO LINK

[75] Inventors: Veronica Stoodley, Shelbyville, Tenn.; Ronald C. Davies, Ft. Lauderdale, Fla.

[73] Assignee: Digital Products Corporation, Ft. Lauderdale, Fla.

[21] Appl. No.: 532,054

[22] Filed: May 8, 1990

[51] Int. Cl.5 ...................... H04M 11/04; G08B 23/00

[52] U.S. Cl. ........................................ 379/58; 379/38; 340/573

[58] Field of Search ....................... 379/38, 58, 59, 61, 379/63; 340/573

[56] References Cited

U.S. PATENT DOCUMENTS

| | | | |
|---|---|---|---|
| 4,284,849 | 8/1981 | Anderson et al. | 379/38 |
| 4,706,274 | 11/1987 | Baker et al. | 379/61 |
| 4,760,593 | 7/1988 | Shapiro et al. | 379/38 |
| 4,843,377 | 6/1989 | Fuller et al. | 340/573 |
| 4,924,211 | 5/1990 | Davies | 379/38 |

OTHER PUBLICATIONS

Marcon: publication: Electronic Monitoring Programme, "The Hawk", (Home Curfew Systems), Aug. 1988, pp. 1-6.

*Primary Examiner*—James L. Dwyer
*Assistant Examiner*—Dwayne D. Bost
*Attorney, Agent, or Firm*—Gittes, Marvin S.

[57] ABSTRACT

A personnel monitoring system for monitoring presence or absence of particular individuals at preassigned monitoring locations. A local unit is provided at each monitoring location for detecting presence or absence. Each local unit is arranged for short range radio communication with a mobile unit, so that the presence or absence information from the local units may be obtained by brining the mobile unit into proximity with the various local units, as by an officer traveling near the various monitoring location in series. Each local unit may include the base unit of a standard cordless telephone, whereas the mobile unit may include the portable unit of such a telephone. The system desirably provides intercom communication between the mobile unit and the local unit when selected by the monitoring officer, so that the officer can communicate with the monitored person as desired.

17 Claims, 3 Drawing Sheets

DRIVE-BY PERSONNEL MONITORING SYSTEM WITH RADIO LINK

The present invention relates to personnel monitoring systems.

Electronic personnel monitoring systems have bee utilized in the criminal justice field for maintaining control of persons subject to a term of house arrest. A person subject to house arrest may be required to remain inside his home at all times or during specified hours. House arrest programs are considered useful alternatives to conventional incarceration for convicted criminals and for criminal defendants awaiting trial. Thus, a person sentenced to house arrest will not be subject to the influence of long term criminals in a prison environment. Moreover, the person sentenced to house arrest can maintain relationships with his family and community. The house arrest sentence may be arranged so that the subject person is permitted to leave the house during working hours, and hence may maintain his employment. Moreover, prison space is a scarce and expensive resource. House arrest sentencing conserves this resource.

To maintain effective control of persons subject to house arrest, the controlling authority must monitor their actual compliance with the house arrest program. Thus, the controlling authority must check to see if each monitored person is in his home. Although this theoretically could be done by having officers visit each home at frequent intervals, such an arrangement normally is impractical in that it would require a large number of officers to maintain effective, frequent surveillance of a large group of individual homes. Therefore, automatic systems have been developed for monitoring the presence of persons at their respective homes or other detention locations.

One system which has been widely adopted for this purpose is described in U.S. Pat. No. 4,747,120. As set forth in the '120 patent, telephone dialer means at a central location such as the office of the controlling authority automatically initiates telephone calls from the central location via the community telephone exchange to each home or other remote location where a person is to be monitored. Instruction signal means automatically provide an instruction signal perceptible to the monitored person at the remote location during each such telephone call. In response to this instruction signal, the monitored person performs a predetermined action resulting in transmission of return signals from the remote location to the central location via the telephone line. Test means are provided at the central location for automatically testing the return signals from each home or remote location to determine whether the predetermined action has been performed by the particular person who is supposed to be present at the remote location called. If the test mean at the central location finds that the proper return signals have been returned when a particular person's home has been called, then the test means have automatically determined that the person is home. If not, an alarm is generated at the central location. The system may include an identifying object or tag such as a coded bracelet which is attached to each person to be monitored. The test means may include means for determining whether the identifying object associated with a person assigned to a particular remote location was employed to generate the return signals received from that location. If so, then the proper person is present. Other forms of the system disclosed in the '120 patent use the person's voice as a means of identification.

Systems as described in the '120 patent provide effective monitoring of parolees and other persons subject to house arrest at reasonable cost and with excellent security. Other remote monitoring systems employ a small, low-powered radio transmitter secured to each monitored person and a combination radio receiver and telephone dialer at each remote monitoring location. The receiver normally detects radio frequency signals from the transmitter while the monitored individual is present. If the monitored individual leaves the vicinity of the transmitter, he takes the small transmitter out of range and hence the receiver no longer detects the transmitter signal. In response to such a loss of signal, the telephone dialer is activated to automatically place a call to the central office and transmit an alarm signal to the central office.

Both of these systems use the telephone network. One drawback which has limited application of these systems heretofore has been that some persons to be monitored do not have a telephone line available in their home. This problem in particularly severe in some rural areas, where many homes do not have telephone service. Even in highly developed, urban areas a significant portion of criminals are poor and do not have a home telephone. Accordingly, monitoring systems which require a telephone line to the home have not been useful in monitoring these individuals. Moreover, criminal justice authorities have been concerned that house arrest monitoring systems which require a telephone line will be viewed as discriminating against poor people. Thus, a poor person who does not have a telephone may be sent to a conventional jail because he cannot be placed on a house arrest monitoring program.

As set forth in The National Institute of Justice Report entitled "Electronic Monitoring and Correctional Policy: The Technology and Its Application", June, 1987, pp. 4–5 and 43, attempts have been made to provide personnel monitoring systems which do not require a telephone line to the home of the person to be monitored. One concept proposed for such system would itilize a radio relay link to a central antenna at the central monitoring office essentially as a substitute for a telephone line. This concept would require a sophisticated radio link capable of covering substantial distance, and hence would require substantial radiated power. Installing such a radio link oftentimes is more expensive than installing a telephone line.

Another concept mentioned in The National Institute of Justice report is to provide a tag worn by the person to be monitored which tag includes a small radio transmitter, and provide a mobile radio receiver in a car operated by a monitoring officer. In theory, the monitoring officer simply drives past the home or other location where the monitored person is supposed to be. If the receiver detects the radio signal from the tag transmitter, then the officer knows that the person is present. If the receiver does not detect the tag transmitter signal, then the officer assumes that the person is absent. This concept suffers from many significant drawbacks. To permit monitoring by the officer at random times, the tag transmitter must radiate a substantial signal either continuously or at very frequent intervals, implying a very substantial average power consumption. A battery capable of providing the requisite power for such a device over a reasonable period of time would render the transmitter bulky and uncomfortable for the monitored person. Moreover, the monitored person wearing the tag transmitter may momentarily enter a basement or other region where transmission of the signal is impeded. If the monitoring officer passes by at such time, he will receive an erroneous report that the person is absent. Conversely, the monitored person may be a considerable distance away from his assigned location, but in a location favoring signal transmission, such as in open space or on a rooftop. In this case, the monitoring officer will receive an erroneous indication that the monitored person is present.

Another, more practical system employing a mobile radio receiver for personnel monitoring is disclosed in commonly assigned U.S. patent application Ser. No. 264,201, filed Oct. 28, 1988, which has been assigned U.S. Pat. No. 4,924,211, to issue May 8, 1990. As disclosed in the '201 application and the '211 patent, a personnel monitoring system may include a local unit at each home or other location where a person is to be monitored. Each such local unit may include detector means for determining whether the person is present and sending a report radio signal bearing this information. The system further includes a mobile unit for receiving the report signal. Thus, an officer can detect the report signal from each local unit by bringing the mobile unit into proximity to the various local units seriatim, as by driving by the various monitoring locations. The detector means of the local unit may include means for receiving a tag signal from a tag transmitter worn by the person to be monitored at the particular location. Because the signal from the tag transmitter need only reach the local unit within the person's home, it may be relatively weak. Moreover, the local unit may be arranged to send the report signal continuously or at frequent intervals, whereas the tag transmitter may be arranged to send the tag radio signal infrequently. Thus, the tag transmitter needs only a small battery, and can be small and unobtrusive.

The local unit may be arranged to regard the person as present unless it ceases receiving tag signals for a considerable period of time, such as a minute or more, thus obviating any problems caused by momentary interruptions in the signal path from the monitored person to the local unit. The local unit itself may be permanently positioned for good radio transmission to the street, and may draw power from utility mains. As also disclosed in the '201 application the mobile unit will provide a perceptible signal whenever it is in range of a local unit to be monitored, so that the officer knows that effective radio transmission has occurred. Further, the mobile unit may be provided with a small radio transmitter for sending a coded message to the local unit, causing the local unit in the monitored person's home to sound an audible alarm or otherwise signal the monitored person that the officer is present and that the person should come out of his home and meet the officer on the street. This "callout feature" greatly enhances convenience and safety for the monitoring officer, and allows the monitoring officer to observe the monitored person face-to-face at will. This greatly enhances the psychological effect of the monitoring and permits the officer to detect problems such as drug abuse, intoxication and the like. Moreover, the local unit may incorporate a switch operable by the monitored person and a device for altering the local unit signal responsive to that switch, and the mobile unit may include a device for providing a perceptible signal to the officer that the switch has been activated. This combination allows the monitored person to signal the monitoring officer that the monitored person wishes to see the officer.

Systems according to the '201 application provide practical solutions to many of the problems encountered in personnel monitoring tasks such as house arrest supervision. However, still further improvements would be desirable.

SUMMARY OF THE INVENTION

The present invention provides these improvements.

One aspect of the present invention provides apparatus for monitoring persons at a plurality of preselected monitoring locations. Apparatus according to this aspect of the invention preferably includes a plurality of local units, each disposed at one of the monitoring locations, and each associated with a person to be monitored at that location. Each such local unit desirably includes detector means for determining the presence or absence of the associated person to be monitored, and providing presence information accordingly. Each such local unit also includes activation signal receiving means for receiving a preselected activation signal transmitted through free space and report signal sending means connected to the detector means and to the activation signal receiving means, the report signal sending means being operative to transmit a report signal bearing the presence information through free space only in response to receipt of the activation signal by the activation signal receiving means. The apparatus according to this aspect of the invention may also include a mobile unit including activation signal sending means for sending the activation signal through free space and report signal receiving means for detecting the report signal and recovering the presence information from the report signal, so that presence information regarding all of the persons to be monitored can be recovered by bringing the mobile unit within range of all of the monitoring locations seriatim and sending the activation signal while the mobile unit is within range of each monitoring location.

Each local unit may include a radio receiver adapted to receive radio frequency signals bearing audio information and to recover the audio information therefrom, and a radio transmitter adapted to accept audio frequency signals and transmit radio frequency signals bearing the audio frequency information. The report signal sending means may include means for generating one of a plurality of audio presence signals depending upon the presence information, so that the audio presence signal is passed to the radio transmitter. The mobile unit may also include a radio transmitter and radio receiver for transmitting and receiving radio frequency signals bearing audio frequency information. The report signal receiving means in the mobile unit may include means for accepting audio frequency information recovered by the radio receiver of the mobile unit.

Because the local unit only sends the report signal in response to the activation signal, it will not radiate the report signal continually. Thus, the system will come under the relatively liberal government regulations governing intermittently operated transmitters rather than under the more stringent regulations governing devices operating substantially continually. It can operate in bands of the radio frequency spectrum allocated for intermittent use, and can provide a radiated signal of substantial power.

A further, particularly preferred aspect of the present invention includes the realization that components of standard, commercially available cordless telephones can be utilized in the local and mobile units. Commercially available cordless telephones typically include a base unit and a portable unit. The base unit typically incorporates a plug for connection to the telephone line, a radio transmitter, a radio receiver and suitable devices for activating the transmitter only in response to receipt of a preset activation code by the receiver. The portable unit typically incorporates a radio receiver and radio transmitter adapted to communicate with the receiver and transmitter of the base unit. The portable handset unit of the cordless telephone typically also includes activation code sending means for sending the activation code to the base unit when the portable unit is manually activated. Essentially all of these features can be utilized in a personnel monitoring system according to this aspect of the present invention, substantially without modification. Thus, each local unit utilized in a personnel monitoring system according to this aspect of the present invention may incorporate the base unit of a cordless telephone together with the detector means for detecting presence or absence of a monitored person and means for generating an audio presence signal representing the presence information. The audio frequency generator may be connected to the transmitter of a cordless telephone base unit. The mobile unit of a system in accordance with the invention may include the portable unit of the cordless telephone. An appropriate automatic device for distinguishing between the audio frequency signals may be connected to the radio receiver of the portable unit.

The cordless telephone portable unit ordinarily includes a handset, i.e., a microphone and an earpiece or small loudspeaker. In a particularly preferred arrangement, the local unit is also provided with a handset and with selectively operable intercom connect means responsive to a predetermined intercom connect signal to connect the local unit handset to the radio transmitter and the receiver of the local unit. Thus, the local unit handset can be linked to the handset of the mobile unit for voice communication therebetween. The mobile unit preferably includes selectively operable intercom connect signal means for actuating the radio transmitter of the mobile unit to send the intercom connect signal. Thus, the officer can establish voice communication with the person to be monitored at the officer's option while the officer is within range.

Each local unit may also include selectively operable line-connect means responsive to a predetermined line-connect signal for connecting the radio transmitter and radio receiver of the local unit to a telephone line at the monitoring location. Such connection, established while the mobile unit is in radio communication with the local unit, will place the handset of the mobile unit in connection with the telephone line at the monitoring location. The monitoring officer can use this line to contact a central office or to relay an emergency message. The mobile unit desirably incorporates selectively operable means for sending the line-connect signal.

The standard cordless telephone portable unit typically includes a device for entering digits to be dialed, such a key pad or rotary dial. The line-connect signal and the intercom connect signal may each consist of one or more preselected digit signals and the means for sending these signals may include the entry device of the cordless telephone portable unit. The dialing entry means may also be used to enter other signals, such as a signal alerting the monitored person to contact the officer. The local unit may include means for altering the report signal to indicate that the monitored person wishes to see the officer or otherwise requires the officer's assistance.

As will be appreciated, preferred apparatus according to these aspects of the present invention provides a versatile system but can be constructed, in large part, using standard components of cordless telephone systems. The components are manufactured in great quantity and hence are available at low cost.

These and other objects, features and advantages of the present invention will be more readily apparent from the detailed description set forth below, taken in conjunction with the accompanying drawings.

DETAILED DESCRIPTION OF THE PREFERRED EMBODIMENTS

Figure 1:
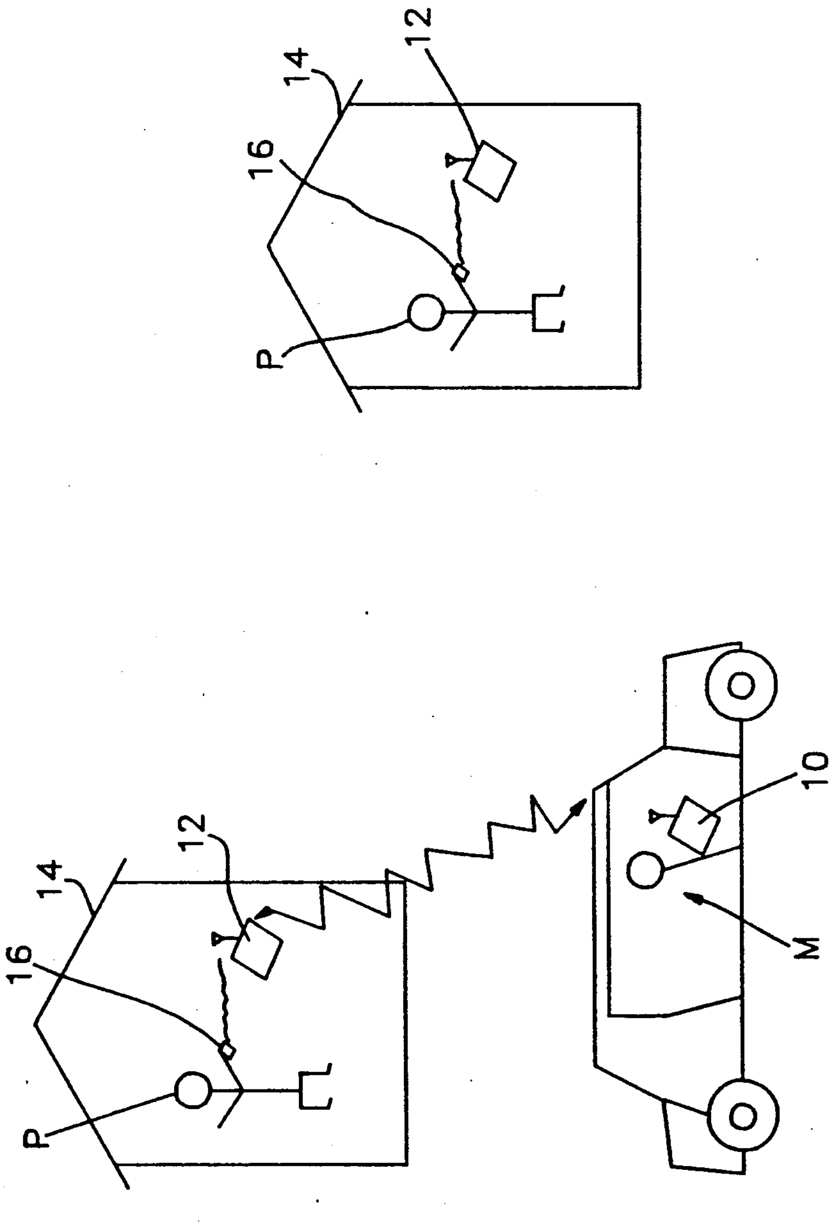
FIG. 1 is a diagrammatic view illustrating a monitoring system in accordance with one embodiment of the present invention.

A system in accordance with one embodiment of the present invention includes a mobile unit 10 and many local units 12, of which only two are shown. Each local unit 12 is positioned in a home 14 or other location where the presence or absence of a particular person is to be monitored. Each local unit 12 is associated with a particular person to be monitored at the associated location 14. As further described below, each local unit 12 incorporates means for detecting the presence or absence of that particular person at the particular location of the local unit. To facilitate such detection, each person P to be monitored is provided with a tag transmitter 16 worn by that person. Each tag transmitter 16 is secured in semipermanent fashion to the person to be monitored, as by a strap 18 about the wrist or ankle of the monitored person. Each tag transmitter 16 is arranged to emit a relatively low-powered tag radio signal at infrequent intervals, such as every 30 seconds or so, such tag radio signal bearing a predetermined code identifying it as the signal from a particular transmitter 16 and hence as coming from a particular individual being monitored. tag transmitter 16 may also include means for detecting severance or attempted severance of Strap 18 and altering the tag signal responsive to any such severance or attempted severance. The tag transmitter may be of the type disclosed in the aforementioned U.S. patent application Ser. No. 07/264,201 filed Oct. 28, 1988 the disclosure of which is hereby incorporated by reference herein. Other appropriate tag signal transmitters are disclosed for example in co-pending, commonly assigned U.S. patent application Ser. No. 07/200,088, filed May 27, 1988, the disclosure of which is also hereby incorporated by reference herein.

Each local unit 12 includes a cordless telephone base unit 20 and a converter module 22. Cordless telephone base unit 20 may be conventional cordless telephone base unit such as that sold as part of an ordinary cordless telephone for home use. The cordless telephone base unit 20 includes a line connector 24 adapted to connect with a standard telephone line. Base unit 20 further includes a radio frequency receiver adapted to receive radio frequency signals on a predetermined carrier frequency, typically about 46 Mhz, which radio frequency signals bear audio frequency information. This is a standard frequency allocated by the United States Federal Communications Commission to cordless telephone service. Receiver 26 is adapted to recover the audio frequency information from the incoming radio frequency signals and pass that audio frequency information to line connector 24. Base unit 20 further incorporates a radio frequency transmitter 28 adapted to take audio frequency information appearing at connector 24 and provide a radio frequency signal bearing that audio frequency information. The transmitter 28 is arranged to operate on a carrier frequency such as 49 Mhz, different from the carrier frequency accepted by receiver 26. The transmitter carrier frequency is also a standard cordless telephone frequency. Transmitter 28 and receiver 26 are connected to a base unit antenna 30 for radiation and reception from free space of the radio frequency signals. The cordless telephone base unit 20 further includes an activation code detector 32 connected to receiver 26. Code detector 32 is arranged to detect a preselected code indicating that a portable unit is seeking to establish radio communication with the base unit.

Receiver 26 is arranged for substantially continuous operation, and is powered by a power supply (not shown) built into the base unit 20. The power supply may be arranged to draw power from a utility outlet, and may optionally be provided with a battery backup. Transmitter 28 is normally quiescent, and is arranged to radiate an RF signal only when activated by activation code detector 32 and for a period of time thereafter while there is continued radio communication through receiver 26. Base station 20 further includes a switch unit 34. Switch unit 34 is arranged to connect the RF receiver 26 and RF transmitter 28 to line connector 24 responsive to detection of the appropriate activation codes by code detector 32. Switch unit 34 is also arranged to momentarily break this connection responsive to pulse dialing information recovered by RF receiver 26, so as to provide a series of brief disconnections or dialing pulses equal in number to a digit denoted by the pulse dialing information. Thus for the digit "1" the switch unit 34 will provide 1 momentary disconnection; for the digit "2", it will provide 2 momentary disconnections, and so on. The portable telephone base unit 20 further includes a "in use" indicator lamp 36. Lamp 36 is powered by the power supply of the portable telephone base unit, and is controlled by switch unit 34. While the receiver 26 and transmitter 28 are connected to line connector 24, voltage is applied across in use lamp 36 via leads 37 and the lamp glows. When the receiver and transmitter are disconnected from line connector 24, the lamp is off. As the switch unit sends the dialing pulses to line connector 24 as discussed above, it repeatedly releases and reapplies voltage on leads 37 to lamp 36, causing the lamp to flash.

All of the components discussed above with reference to cordless telephone base unit 20 are standard components of the base unit as normally provided a part of the commercially available cordless telephone.

Converter module 22 of the local unit 12 includes a tag signal receiver 40 and associated receiving antenna 42. Tag signal receiver 40 is adapted to receive the tag signal from the tag signal transmitter 16 used by the associated person. Thus, each tag signal receiver typically is adapted to examine incoming tag signals for presence of a particular code associated with the particular tag signal transmitter. The tag signal receiver 40 and transmitter 16 operate on a different frequency than the receiver 26 and transmitter 28. Tag signal receiver 40 is arranged to provide an information bit on a first output line 44 indicating whether or not the signal from the proper, associated tag signal transmitter 16 has been received within a predetermined interval, such as within the immediately preceding one minute. The bit has a first or present value when the proper tag signal has been received and a second or absent value when the proper tag signal has not been received. The tag signal receiver thus provides presence information on line 44. Tag signal receiver 46 provides another bit on line 46. This bit normally has a first value, but is set and latched at a different value when the receiver detects the particular alteration in the signal from tag signal transmitter 16 indicating attempted severance of wrist Strap 18. Tag signal receiver 40 may be in accordance with the aforementioned patent applications.

Converter module 22 further includes a contact request momentary switch 48 and a bistable latch 50. Latch 50 provides a further bit of information on line 54. Actuation of switch 48 toggles latch 50 from one state to another, and hence changes the value of the bit on line 54. A contact request indicator lamp 52 is linked to latch 52 so that the lamp is lit when the bit on line 54 is high and dark when the bit on line 54 is low.

The converter module further includes a standard telephone handset 56 having a mouthpiece or microphone 58 and an earpiece or loudspeaker 60. Handset 56 also has a numeric keypad 62 with appropriate digit encoding devices (not shown). A Magnet 64 is physically attached to handset 56. Handset 56 is physically separate from the remaining components of converter module 22. A flexible cable 66 extends between handset 56 and the housing 68 of the converter module. A magnetic reed switch 70 is physically mounted within the housing 68 so that when handset 56 is in place resting on the housing, and hence is not in use, the reed switch is open. When the handset 56 is lifted from Housing 68, as is necessary to use the handset, the reed switch is open An on-hook detector circuit 72 is electrically connected to reed switch 70. On-hook detector 72 provides a further bit on a line 74, this bit having different values according to whether handset 56 is or is not in place on the housing.

Lines 44, 46, 54 and 74 are connected to a status select logic circuit 76. Logic circuit 76 combines the values of the four bits provided on lines 44, 46, 54 and 74 into a four-bit data code specifying any one of sixteen possible combinations. The apparatus further includes a Dual Tone Multi-Frequency ("DTMF") generator 78. DTMF generator 78 is arranged to provide any one of sixteen possible audio-frequency tone combinations, according to the well known dual tone multi-frequency system commonly used for conveying telephone dialing data, in response to the data provided by status select logic circuit 76.

The converter module 22 further incorporates a telephone line input 80 and a telephone line output 82. These are in the form of standard telephone connection jacks. Line input connection 80 is arranged to engage a connection on a telephone utility line 84, such as a standard telephone wall outlet, whereas line output 82 is arranged to engage the line connector 24 of the cordless telephone base unit 20. The converter module further includes a pair of relay switches 86 and 88. The switches are arranged to interconnect line input, 80, line output 82, DTMF generator 78 and handset 56 in the following combinations:

TABLE I

| Combination | Connections |
| --- | --- |
| Normal | Handset 56 connected to line input 80; DTMF generator 78 connected to line output 82 |
| Intercom | Handset 56 connected to line Output 82; DTMF generator 78 and line input 80 disconnected |
| Line Connect | Line output 82 connected to line input 80; DTMF generator 78 and handset 56 disconnected |

The converter unit 22 further includes a buzzer 90 arranged to provide an audible alarm signal, and an alert lamp 92 linked to a bistable latch 94 so that when latch 94 is in one state lamp 92 will be lit whereas when latch 94 is another state lamp 92 will be dark. Buzzer 90 and latch 94, as well as switches 86 and 88, are linked to an actuator 96. The reset input (not shown) of latch 94 is connected to momentary switch 48 so that latch 94 can be reset by actuating switch 48 twice in succession.

Actuator 96 is arranged to control these elements according to the count in a counter 98. Counter 98 is connected via leads 100 to the leads 37 feeding the in use lamp 36 of the cordless telephone base unit. Counter 98 is connected so that the count in the counter is incremented whenever the power on leads 37 to lamp 36 is disconnected momentarily and then reconnected. As will be appreciated from the foregoing description of the cordless telephone base unit 20, such disconnection and reconnection occurs whenever switch description of the cordless telephone base unit 20, such disconnection and reconnection occurs whenever switch unit 34 operates to pulse dial a digit, so that the count in counter 98 will be incremented by a number equal to each digit pulse dialed through switch unit 34. A reset unit 102 is provided for resetting the count in counter 98 to 0 whenever leads 37 are de-energized (lamp 36 dark) for five seconds continuously. A Count Inhibit circuit 104 and a Timer 106 are arranged to selectively inhibit incrementing of counter 98. In particular, Count Inhibit circuit 104 and Timer 106 will stop the incrementing of the count in counter 98 when that count reaches 7, and will continue such inhibition for five seconds thereafter. Count inhibit circuit 104 is also linked to on-hook detector 72 so that the count inhibit circuit will prevent incrementing of the count in counter 98 beyond 5 at any time while on-hook circuit 72 indicates that handset 56 is off hook, i.e., in use. Converter module 22 draws its power from the internal power supply of cordless telephone base unit 20, via connections (not shown) between the internal component of the converter module and the cordless telephone base unit.

Figure 3:
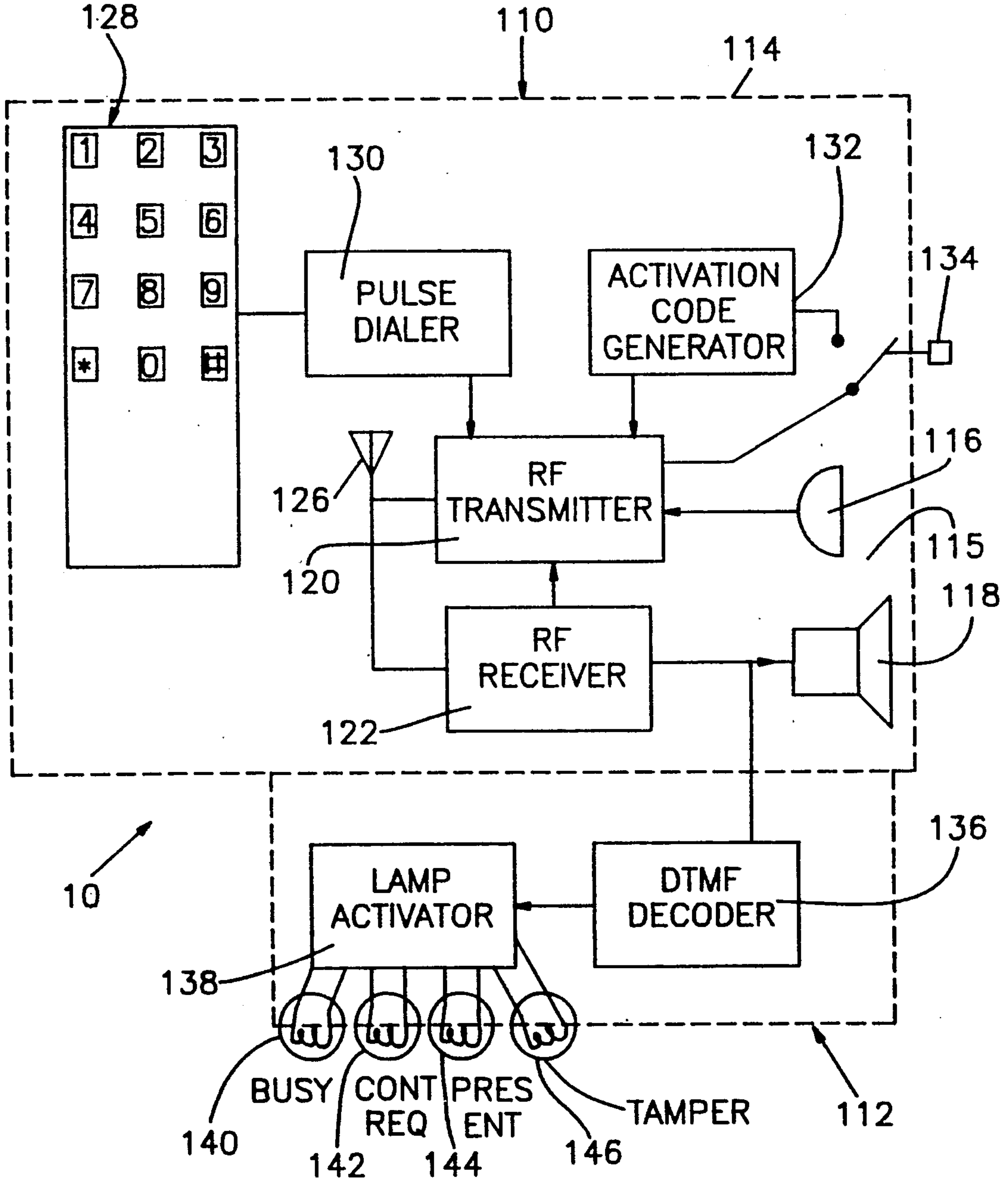
FIG. 3 is a further functional block diagram depicting additional components of the monitoring system of FIG. 1.

Mobile unit 10 (FIG. 3) incorporates a standard cordless telephone portable unit 110 and a signal decoder module 112. Portable unit 110 typically is housed in a casing 114 of about the size and shape of an ordinary telephone handset. The portable unit incorporates the working elements of a handset 115, viz., a microphone 116 and a earpiece or speaker 118. The portable unit further includes a radio frequency transmitter 120 and a radio frequency receiver 122. Transmitter 120 is arranged to accept audio frequency information from handset microphone 116 and emit a radio frequency signal bearing that audio information, whereas receiver 122 is arranged to receive a radio frequency signal and provide the audio frequency information therein to handpiece speaker or earpiece 118. Receiver 122 and transmitter 120 are linked to an antenna 126 for free-space radiation and reception of signals. The portable unit 110 further includes a standard telephone keypad 128 for entry of digital information and a pulse dialer 130 linked to the keypad. Pulse dialer 130 is arranged to accept digits entered on keypad 128 and to pass signals representing those digits into transmitter 120. Transmitter 120 is arranged to convey these digit signals on the radio frequency signals sent by the transmitter. In one arrangement, the pulse dialer 130 may be arranged to provide a series of on-off pulses representing the series of interruptions corresponding to a particular digit, i.e., two interruptions for digit 2, three interruptions for digit 3, and so on. The RF transmitter 120 may be arranged to convey this information by turning the carrier signal of the transmitter on and off in accordance with the pulses.

Cordless telephone portable unit 110 further includes an activation code generator 132 and an On/Off switch 134. Transmitter 120 and receiver 122 ordinarily are quiescent, but are started in response to closure of switch 134. Responsive to closure of switch 134, activation code generator 132 passes activation code information to transmitter 120, which imposes the same upon the radio frequency signal sent by the transmitter. All of the components discussed above with reference to cordless telephone portable unit 110 are standard components of the cordless telephone. These components are compatible with the components of corless telephone base unit 20. Thus, in each system the cordless telephone portable unit 110 of mobile unit 10 has a transmitter and receiver appropriate to communicate with the receiver 26 and transmitter 28 of each cordless telephone base unit 20. Also, the activation codes generated by activation code generator 132 are the same as those detected and acted upon by activation code detector 32 of each bas unit.

The power supply of the cordless telephone portable unit 110 may include on internal battery. An adapter may be provided for releasably connecting the portable unit battery to the vehicle power supply, as through the vehicle cigarette lighter socket. Thus, the portable unit can be carried and used by the officer outside of the vehicle, if desired.

The decoder unit 112 of mobile unit 10 adapts the cordless telephone portable unit 110 to personnel monitoring operations. The adapter unit is extraordinarily simple. It incorporates a dual tone multi-frequency decoder 136 connected in parallel with the earpiece or speaker 118 of the handset 115. Decoder 136 is arranged to detect any of the sixteen possible tone combinations generated by DTMF generator 78 of the local unit and to pass code information representing the detected codes to lamp actuator 138. The lamp actuator is arranged to illuminate one or more of the indicator lamps 140, 142, 144 and 146 linked to the lamp actuator, dependent upon the code information.

The local units 12 and mobile unit 10 of the system discussed above can be fabricated simply and inexpensively. In particular, the converter modules may be assembled and attached to the cordless telephone base unit 20 without appreciable modification of the cordless telephone base unit. The principal connection between each converter module and the cordless telephone base unit is the plug connection of telephone line output 82 with the telephone line connection 24 of the cordless telephone base unit. The remaining connections merely require connections to the power supply of the cordless telephone base unit (not shown) and connection across leads 37 of lamp 36. Use of a prefabricated cordless telephone base unit is particularly advantageous because the same are produced in volume for consumer use and are already licensed for operation by communications authorities. Likewise, the mobile unit 10 can be fabricated readily by attaching the decoder module 112 to the pre-existing cordless telephone portable unit 110. The only connection required is connection of DTMF decoder 136 across the earpiece or speaker 118 of the portable unit handset 115 and connection of the decoder unit components to the power supply of the cordless telephone portable unit 110.

Figure 2:
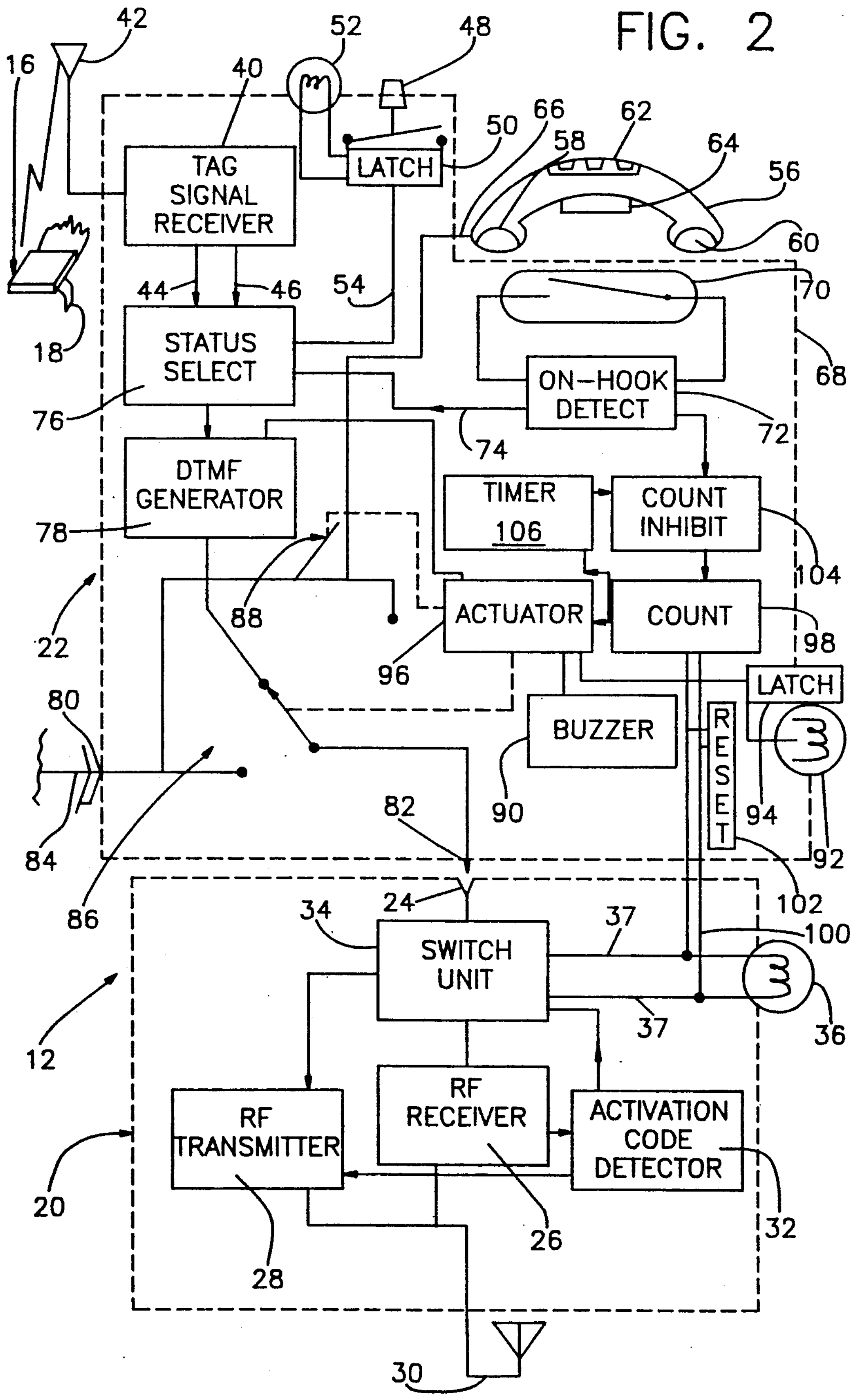
FIG. 2 is a functional block diagram showing certain components of the monitoring system of FIG. 1.

In one monitoring method according to the invention, each person P (FIG. 1) to be monitored is assigned to a particular Monitoring Location 14, typically his home. A local unit 12 is placed at each such monitoring location. If there is a telephone line available at the particular monitoring location, then the line input 80 of the local unit desirably is connected to the telephone line, such as the telephone line 84 (FIG. 2). However, a local unit may be installed at a monitoring location regardless of whether there is a telephone line present. Each person to be monitored is provided with a tag signal transmitter 16, which is attached to that person. The local unit 12 at each Monitoring Location 14 is arranged to monitor the signal from the particular tag signal transmitter assigned to the particular location, and hence to determine the presence or absence of that particular person. So long as the person is present within the Monitoring Location 14, the signal from the tag transmitter 16 of that person will reach the local unit 12.

The tag signal receiver 40 of the local unit 12 continually provides a presence signal on line 44 indicating that the person is present. Also, provided that the person does not tamper with the strap 18 securing the tag signal transmitter to his wrist or ankle, the tag signal receiver 40 will continually provide a on line 46 indicating that tampering has not occurred. If the monitored person has not tripped contact request switch 48, latch 50 will be in a quiescent state and will provide a non-tripped indication bit on line 54. Similarly, provided that handset 56 is in place on the casing 68 of the converter module 22, on-hook detector 72 will provide an on-hook indication bit on line 74. In this quiescent condition of the system, status select unit 76 will provide a 4 bit code indicating that the apparatus is in a quiescent or normal state to DTMF generator 78. DTMF generator 78 will continually emit an audio frequency signal including a combination of tones indicating this quiescent condition.

Also, in the normal or quiescent state of local unit 12, the count in counter 98 is at 0 and actuator 96 maintains switches 86 and 88 in the normal condition shown with handset 56 linked to the telephone line input 80 and with DTMF generator 78 linked to the telephone line output 82, and hence to the line connector 24 of cordless telephone base unit 20.

A Monitoring Officer M brings the mobile unit 10 into proximity with the various local units 12 in series, as by driving in an automobile past the various monitoring locations 14. As the monitoring officer approaches each monitoring location, he brings the mobile unit within the effective transmission range of the RF transmitters and receivers included in the cordless telephone base units and portable units. While the monitoring officer is close to a monitoring location, he may cause the mobile unit 10 to interrogate the local unit 12 by manually actuating the switch 134. Such actuation turns on RF transmitter 120 and RF receiver 122 of the mobile unit, and causes activation code generator 132 to pass the predetermined activation code to transmitter 120. Transmitter 120 thus sends an RF signal bearing the activation code through free space from antenna 126.

As RF receiver 26 of the local unit is continuously operating, it will receive this signal and recover the activation code. Activation code detector 32 of the local unit activates transmitter 28 and actuates switch unit 34 to link the telephone line connector 24 to transmitter 28, thus connecting DTMF generator 78 to the transmitter. Transmitter 28 thus imposes the audio frequency tones 78 from the DTMF generator on a radio frequency signal and sends that signal through free space. This report radio signal is received at receiver 122 of the mobile unit, which recovers the audio frequency signal. The officer hears the audio frequency signal as a tone through the earpiece 118 of the mobile unit handset 115. This confirms that a radio transmission link has been established between the mobile unit and the local unit. The audio frequency signal is also passed to DTMF decoder 136, which in turn sends an appropriate code to lamp actuator 138. Provided that the local unit is in the normal status as aforementioned, the information sent to lamp actuator 138 causes the lamp actuator to illuminate indicator lamp 144 and leave the other lamps dark. The illumination of lamp 144 indicates to the officer that the person at the particular monitoring location is present.

If the monitored person leaves his assigned monitoring location the tag signal receiver in the local unit will not receive the tag signal, and the tag signal receiver thus will set the presence bit on line 44 to a value indicating absence. Assuming all else remains the same as in the normal state, status select unit 76 will cause DTMF generator 78 to generate a second, different set of tones. When the officer actuates mobile unit 10 to interrogate that particular local unit, the audio frequency information borne by the RF report signal from transmitter 28 will incorporate this second audio signal. This audio signal likewise will be passed to the earpiece 118 of the mobile unit handset and to DTMF decoder 136. Once again, the officer can confirm that the radio link has been established in that he hears the audio frequency information as a set of tones. However, these different tones will cause DTMF decoder 136 and lamp actuator 138 to leave all of the lamps unilluminated. Because presence indicator lamp 144 remains off during such interrogation of the local unit, it indicates that the monitored person at the location of the local unit being interrogated is absent.

Interrogation of the local unit by the monitoring officer as described above does not result in any perceptible indication at the local unit. Thus, the monitored person may be unaware of such interrogation. If the officer is satisfied with such interrogation, he need do nothing further, and can proceed to the next local unit and interrogate it in similar fashion. Because the officer can interrogate each local unit without detection by the monitored person at such local unit, it is difficult for the monitored person to learn the monitoring officer's schedule. Therefore, the monitored person is deterred from any attempt to defeat the system by leaving the monitoring location and returning before the next expected return of the monitoring officer.

If the officer finds that the monitored person is absent, he may leave a warning message simply by entering the digit "3" on the numeric keypad 128 of the mobile unit during the interrogation. Upon such entry, pulse dialer 130 passes the digit information to RF transmitter 120 which in turn imposes it on the RF signal. When that digit information is received by receiver 26 of the local unit, it actuates the switch unit 34 to connect and disconnect the voltage on lines 37 three times. This increments the count in counter 98 to a value of 3 and holds that count. When the count remains at 3 for a period of five seconds, actuator 96 trips latch 94 to an on state, causing warning lamp 92 to illuminate and to remain illuminated. This warning lamp indicates to the monitored person that he must contact the supervising agency, as by contacting the monitoring officer. When the officer has completed his interaction with a particular local unit, he may trip switch 134 to the off position, thus terminating the transmission from transmitter 120, or else he may simply drive away from the particular monitoring location, taking mobile unit 10 out of range. In either case, the signal to receiver 26 of the local unit terminates. In response to this termination, activation detector 34 deactivates transmitter 28 and switch unit 34 disconnects the voltage to leads 37 and hence the power applied to reset unit 102. In response to such disconnection, reset unit 102 starts timing. If five seconds elapse without reapplication of the voltage to reset unit 102, the reset unit will reset the count in counter 98 to zero. However, latch 94 remains in its on condition and lamp 92 remains illuminated until latch 94 is manually reset by the monitored person, by actuating switch 48 two times. The monitored person may leave a message for the monitoring officer by actuating contact request switch 48 once. Upon such actuation, latch 50 is tripped to its on condition, and provides a contact request signal bit on line 54. This signal causes status select generator 76 to provide a different code to DTMF generator 78, and thus causes alteration of the audio frequency signal sent by DTMF generator 78. When the officer next interrogates the local unit by means of mobile unit 10, this different audio signal will be passed through the local unit RF transmitter 28 and local unit RF receiver 122, and will cause DTMF decoder 136 and lamp actuator 138 to illuminate the contact request lamp 142, thus indicating that the monitored person desires to speak to the monitoring officer.

If the monitoring officer wishes to speak to the monitored person, he may interrogate the local unit as discussed above, thus establishing the radio link between the mobile unit and the local unit, and enter the digit "7" on numeric keypad 128. Again, pulse dialer 130 will generate the appropriate digit signal for the digit "7", which will be passed through mobile unit RF transmitter 120 and local unit RF receiver 26, thus causing switch unit 34 to disconnect and reconnect the voltage on lines 37 seven times. Assuming that the count in counter 98 was at zero at the start of tee interrogation, the count in counter 98 will stop at 7. When the count is at 7, actuator 96 and Timer 106 will operate buzzer 90, thus providing an audible signal to the monitored person that the officer wishes to speak with him. At this time, the switches 86 and 88 remain in the normal position as indicated, and DTMF generator 78 remains connected to the RF transmitter 28, so that the officer continues to hear the tone from the DTMF generator at the mobile unit. While the count is at 7, actuator 96 repeatedly turns DTMF generator on and off intervals. The officer at the mobile unit hears this as repeated pulsing of the audio tone, much like a normal ringing signal sent to the dialing party on a telephone line. If the monitored person lifts handset 56 while the system is in this condition, on-hook detector 72 will signal actuator 96, and actuator 96 will in turn trip switches 86 and 88 to the intercom condition. Thus, handset 56 will be disconnected from telephone line input 80 and connected to the telephone line output 82 of the converter module 22, and hence to the RF transmitter 28 and RF receiver 26 of the cordless telephone base unit, whereas DTMF generator 78 and telephone line input 80 will be disconnected from the remaining elements of the system. In this condition, there is a direct audio communication link between handset 56 and the handset 115 at the mobile unit. The officer can converse with the monitored person over this link. For example, the officer may use this link to request that the monitored person come outside and meet the officer. The officer may actuate the system to establish this link in response to the contact request indication discussed above.

If a telephone line is connected to the local unit via the telephone line input 80 of the converter module, the officer can establish telephonic communication over that line through the mobile unit. To establish such communication while the mobile unit is interrogating the local unit, the officer must first attempt to establish intercom communication by entering a "7" as discussed above. Timer 106 locks the count in counter 98 at 7 for 5 seconds after the count reaches 7. If handset 56 is not lifted within this 5-second delay, the lock is released. The officer may now enter the digit "2" or any higher digit on numeric keypad 128. Once again, appropriate pulse dialing signals are sent through mobile unit RF transmitter 120 and local unit RF receiver 26. The voltage on lines 37 is pulsed nine times, bringing the count in counter 98 to 9. Counter 98 is arranged to stop at 9, and hold the count at 9 until the counter is resent, regardless of additional dialing pulses. When the count in counter 98 reaches 9, actuator 96 trips switches 86 and 88 to the line connect position. In this position, handset 56 and DTMF generator 78 are disconnected, whereas telephone line input 80, and hence telephone line 84 is connected to the RF transmitter 28 and RF receiver of the local unit. Thus, the telephone line 84 is connected, through the radio link between the local and mobile units, with the handset 115 of the mobile unit. The officer can place a call in the normal manner by entering digits to be dialed on keypad 128, thus sending further digit signals over transmitter 120. These transmitter signals will be transmitted through receiver 26 and onto the telephone line 84. The officer can then speak over the line. This feature is particularly useful in that it allows the officer to report absent persons promptly, without leaving his car and without the need for any separate communications link between the officer and his headquarters. Once the officer terminates by the radio link by deactivating the mobile unit or by driving away, reset unit 102 again brings the count in counter 98 to zero. In response to the zero count, actuator 96 returns switches 86 and 88 to the normal condition, with the DTMF generator 78 again connected to the line ouput 82 and with handset 56 connected to telephone line input 80 and hence to telephone line 84.

When the system is in its normal condition, with handset 56 connected through switches 86 and 88 to telephone line input 80 and hence to telephone line 84, the monitored person and others at the monitoring location can use handset 56 and the associated dialing keypad 62 in the same way as a normal telephone for communication over the telephone line 84. The system protects the privacy of these conversations. The telephone line outlet 82, and hence the RF transmitter 28 and RF receiver 26 of the cordless telephone base unit 20, cannot be connected to the telephone line input 80 or to handset 56 while the handset is also connected to the telephone line input 80 and telephone line 84. Additional features of the system prevent unwanted interruptions of telephone conversations. While handset 56 is in use, on-hook detector 72 provides an off-hook indication bit on line 74 to status select unit 76. This indication is incorporated in the code passed by the status select unit to the DTMF generator, and hence in the tone combination sent by the DTMF generator and received by DTMF decoder 136 of the mobile unit. This causes the lamp actuator 138 to illuminate the Busy indicator 140, thus indicating to the officer that he should not try to establish intercom communication or a connection to the telephone line at the local unit. If the officer ignores this indication, and tries via keypad 128, the digit signals will actuate the switch unit 34 of the cordless telephone base unit, which in turn will disconnect and reconnect the voltage on line 37. Counter 98 will increment in the normal fashion. However, as handset 56 is in use, on-hook detector 72 will enable count inhibit unit 104.

In this condition, count inhibit unit 104 will stop counter 98 at a count of "5". As the count cannot reach "7" or "9", actuator 96 will not trip switches 86 and 88 into the intercom position or into the line connect position. Thus, the switches remain in the normal position, with the DTMF generator connected to the cordless telephone base unit 20 and with the handset 56 remaining connected to the telephone line, so that telephone communication can continue without interruption. In this condition, with the count remaining at "5", actuator 96 operates Buzzer 94 for a period of five seconds, thus signalling the person at the monitoring location that the officer wishes to use the system. As DTMF generator 78 remains connected to the cordless telephone base unit, and as it remains in a continuous operation, the officer will continue to hear the continuous tone rather than the on/off tone which occurs when the count reaches 7. Moreover, the Busy indicator 140 on the mobile unit will remain illuminated. Thus, the officer will know that the system has not gone into intercom mode because the handset is in use. If the person at the monitoring location terminates the conversation and places handset 56 back on hook, the on-hook bit from on-hook detector 74 will cease, which will change the code sent by status selector unit 76 and the audio signal from DTMF generator 78, causing the busy indicator 140 at the mobile unit to turn off. At this point, the officer can restart the cycle by turning off switch 134 for a period of five seconds, thus breaking the radio communications link and causing reset unit 102 to reset the count in counter 98 to zero. If the officer then restarts the mobile unit using switch 134 and enters a "7" the system will go into intercom mode. If the person at the local unit does not terminate the conversation, the officer can similarly break the radio communications link by turning switch 134 off so as to reset the count, restart the system, and enter a "3" on keypad 98 so as to leave a warning message by illumination of warning indicator lamp 92.

The system described above thus provides a versatile monitoring system. At each location and at any time, the monitoring officer may check presence or absence of the monitored person covertly, without alerting anyone at the monitoring location. Alternatively, the monitoring officer can speak to the person to be monitored and, if necessary, arrange to meet the monitored person. The monitored person can contact the officer and the officer can leave a warning message. The system works as described above even if no telephone line is present at a particular monitoring location, except that the officer cannot establish telephone communication over a telephone line.

As will be appreciated, numerous variations and combinations of the features discussed above can be utilized without departing from the present invention. For example, the presence detection device incorporated in the local unit need not use a tag signal receiver as discussed above. Instead, the local unit may be arranged to signal the monitored person, either periodically or in response to a signal from the mobile unit to perform some action demonstrating that the proper person is present at the monitoring location. For example, the local unit may be equipped with means for detecting insertion of an encoded object such as an encoded wristlet worn by the monitored person, and the local unit may be arranged to signal the monitored person with an audible tone, lamp or voice message to insert the encoded object into the local unit for verification. Alternatively, the monitored person may be instructed to speak into the local unit handset. The resulting voice report signal may be tested by a voice recognition device at the local unit or else may be incorporated in the report signal and tested at the mobile unit. The officer can "test" the voice signal manually, by listening to it. This approach is not preferred because of the difficulty of obtaining positive identification in this way and the labor involved. The mobile unit may also incorporate a recorder for recording voice report signals, for subsequent manual or automatic recognition.

The mobile unit may be arranged to send dialing signals as DTMF tones or other audio frequency signals, and the local unit may be equipped with a DTMF decoder for receiving these signals and setting the local unit to intercom mode or line connect mode accordingly. Signals other than audio frequency may also be used in the report signal sent by the local unit and/or in the signals sent by the mobile unit to the local unit. As the tones for the DTMF Generator 78 are reproduced at the handset 115 of the mobile unit, the officer can use these tones as an indication of the status of the local unit. Where the difference in tone between the various report signals sent by the local unit is substantial, these tonal differences can be used as an indication of the local unit status. For example, the differences in tones may be used to indicate presence or absence to the officer. Thus, the DTMF decoder and lamp actuator 138 can be omitted. In this case, the mobile unit may consist solely of the standard cordless telephone portable unit.

As these and other variations and combinations of the features discussed above may be utilized without departing from the present invention as defined by the claims, the foregoing description of the preferred embodiments should be taken by way of illustration rather than by way of limitation of the present invention.

What is claimed is:

1. Apparatus for monitoring a plurality of persons at a plurality of preselected monitoring locations comprising:

(a) a plurality of local units each disposed at one of said monitoring locations and associated with a person to be monitored at that location, each said local unit including detector means for determining the presence or absence of the associated person to be monitored and providing presence information accordingly, each said local unit including activation signal receiving mean for receiving a preselected activation signal transmitted through free space and report signal sending means connected to said detector means and to said receiver means for transmitting a report signal bearing said presence information through free space only in response to receipt of said activation signal; and (b) a mobile unit including activation signal sending means for sending said activation signal through free space and report signal receiving means for detecting said report signal and recovering said presence information, whereby presence information regarding all of the persons to be monitored can be recovered by bringing said mobile unit within range of all of said monitoring locations seriatim and sending said activation signal while said mobile unit is within range of each said monitoring location.

2. Apparatus as claimed in claim 1 wherein said activation signal sending means is selectively operable.

3. Apparatus as claimed in claim 1 wherein each said report signal sending means is operative to send a first report signal when said presence information indicates that the person to be monitored is present and a second report signal different from said first report signal when said presence information indicates that the person to be monitored is absent, whereby receipt of either said first report signal or said second report signal by said report signal receiving means indicates that the local unit is within range of the monitoring location and that said activation signal sending means, activation signal receiving means, report signal sending means and report signal receiving means are operative.

4. Apparatus as claimed in claim 1 further comprising mobile unit indicator means on said mobile unit for providing a perceptible indication at the mobile unit of the presence information recovered from each said report signal.

5. Apparatus as claimed in claim 1 wherein said mobile unit further comprises selectively operable warning signal sending means for sending a warning signal through free space and wherein each said local unit further includes warning signal receiving means for providing a perceptible indication upon receipt of said warning signal.

6. Apparatus as claimed in claim 1 wherein each said local unit further includes selectively operable contact request means for altering said report signal in response to actuation of said contact request means by the person to be monitored and wherein said mobile unit includes means for detecting such alteration and providing a perceptible indication thereof.

7. Apparatus as claimed in claim 1 wherein each said local unit includes a radio receiver adapted to receive radio frequency signals bearing audio frequency information and recover said audio frequency information therefrom and a radio transmitter adapted to accept audio frequency information and transmit a radio frequency signal bearing said audio frequency information.

8. Apparatus as claimed in claim 7 wherein said mobile unit includes a mobile unit radio transmitter for accepting audio frequency signals and transmitting a radio frequency signal bearing said audio frequency signals and a mobile unit radio receiver for detecting radio signals bearing audio frequency information and recovering the audio frequency signals therefrom.

9. Apparatus as claimed in claim 8 wherein said detector means in each said local unit includes means for providing said presence information an audio frequency presence signal to the radio transmitter of that local unit, said report signal receiving means of said mobile unit including means for accepting audio frequency signals from said mobile unit radio receiver, detecting said audio frequency presence signal and discriminating between different audio frequency presence signals conveying different presence information.

10. Apparatus as claimed in claim 8 wherein said mobile unit further includes a mobile unit handset connected to said mobile unit radio receiver and mobile unit radio transmitter.

11. Apparatus as claimed in claim 10 wherein each said local unit includes connection means for coupling the radio transmitter and receiver of that local unit to a telephone line at the monitoring location for transmission of audio frequency signals therebetween upon receipt of a line-connect signal by the receiver, and wherein said mobile unit includes selectively operable line signal means for actuating said mobile unit radio transmitter to send said line-connect signal, whereby said mobile unit handset may be connected to a telephone line through said mobile unit radio transmitter, said local unit radio receiver, said local unit radio transmitter and said mobile unit radio receiver upon operation of said line signal means.

12. Apparatus as claimed in claim 11 wherein said mobile unit further includes dialing input means for accepting manual entry of digits, generating digit signals responsive to the entered digits and passing said digit signals to said mobile unit radio transmitter, said radio receiver of each said local unit including means for recovering said digit signals.

13. Apparatus as claimed in claim 12 wherein said line-connect signal includes one or more preselected digit signals, said line signal means of said mobile unit including said dialing input means.

14. Apparatus as claimed in claim 10 wherein each said local unit further includes a local unit handset, and intercom connect means responsive to reception of a predetermined intercom connect signal for connecting said local unit handset to said local unit radio transmitter and said local unit radio receiver, so that said local unit handset will be linked to said mobile unit handset for voice communication therebetween, said mobile unit further comprising selectively operable intercom connect signal means for activating said mobile unit radio transmitter to send said intercom connect signal.

15. Apparatus as claimed in claim 14 wherein said mobile unit further includes dialing input means for accepting manual entry of digits, generating digit signals responsive to the entered digits, generating digit signals responsive to the entered digits and passing said digit signals to said mobile unit radio transmitter, said radio receiver of each said local unit including means for recovering said digit signals, said intercom connect signal including one or more preselected digit signals, said intercom connect signal means of said mobile unit including said dialing input means.

16. Apparatus as claimed in claim 14 wherein each said local unit includes means for connecting said local unit handset to a telephone line at the monitoring location and means for inhibiting operation of said intercom connect means while said local unit handset is in use with the telephone line.

17. Apparatus as claimed in claim 1 wherein said detector means includes a tag signal receiver at said local unit for receiving a preselected ratio frequency tag signal and providing said presence information to indicate that the person to be monitored is absent if said tag signal is not received.

* * * * *